United States Patent
Li et al.

(10) Patent No.: US 7,359,446 B2
(45) Date of Patent: Apr. 15, 2008

(54) METHODS AND DEVICES FOR DECODING SIGNALS CONTAINING NOISE AND DISTORTION

(75) Inventors: Tongtong Li, Okemos, MI (US); Masoud Sajadieh, Morganville, NJ (US); Mohsen Sarraf, Rumson, NJ (US); Masood Yousefi, Marlboro, NJ (US); Robert L. Cupo, Eatontown, NJ (US); Thomas W. Goeddel, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 685 days.

(21) Appl. No.: 10/639,524

(22) Filed: Aug. 13, 2003

(65) Prior Publication Data

US 2005/0036565 A1    Feb. 17, 2005

(51) Int. Cl.
*H04L 23/02* (2006.01)
*H03D 1/00* (2006.01)

(52) U.S. Cl. .................................. 375/262; 375/341
(58) Field of Classification Search ............... 375/262, 375/341; 714/794, 795
See application file for complete search history.

(56) References Cited

U.S. PATENT DOCUMENTS

| 5,966,401 | A  | * | 10/1999 | Kumar .......................... 375/150 |
| 6,189,123 | B1 | * | 2/2001 | Anders Nystrom et al. ........................ 714/751 |
| 2002/0136318 | A1 | * | 9/2002 | Gorokhov et al. .......... 375/261 |
| 2003/0093741 | A1 | * | 5/2003 | Argon et al. ................ 714/755 |
| 2003/0180041 | A1 | * | 9/2003 | Azadet ......................... 398/25 |
| 2004/0037262 | A1 | * | 2/2004 | Tanada ........................ 370/342 |

* cited by examiner

*Primary Examiner*—Khai Tran

(57) ABSTRACT

"Reliability-related" values are assigned to received signal samples containing noise and distortion. The samples are then sent to a Viterbi decoder in order to regenerate originally transmitted messages.

15 Claims, 5 Drawing Sheets

|  | R7-,R6- | R5-,R4- | R3-,R2- | R1-,R0- |
|---|---|---|---|---|
| b0 | 0 | 0 | 0 | 0 |
| w0 | 00 | 01 | 10 | 11 |
| $d(P_x,0)$ | 0 | 1 | 2 | 3 |
| $d(P_x,1)$ | 7 | 6 | 5 | 4 |

|  | R0,R1 | R2,R3 | R4,R5 | R6,R7 |
|---|---|---|---|---|
| b0 | 1 | 1 | 1 | 1 |
| w0 | 11 | 10 | 01 | 00 |
| $d(P_x,0)$ | 4 | 5 | 6 | 7 |
| $d(P_x,1)$ | 3 | 2 | 1 | 0 |

FIG. 4

|   | R7- | R6- | R5- | R4- | R3- | R2- | R1- | R0- | R0 | R1 | R2 | R3 | R4 | R5 | R6 | R7 |
|---|---|---|---|---|---|---|---|---|---|---|---|---|---|---|---|---|
| b1 | 0 | 0 | 0 | 0 | 1 | 1 | 1 | 1 | 1 | 1 | 1 | 1 | 0 | 0 | 0 | 0 |
| w1 | 00 | 01 | 10 | 11 | 11 | 10 | 01 | 00 | 00 | 01 | 10 | 11 | 11 | 10 | 01 | 00 |
| $d(P_\chi,0)$ | 0 | 1 | 2 | 3 | 4 | 5 | 6 | 7 | 7 | 6 | 5 | 4 | 3 | 2 | 1 | 0 |
| $d(P_\chi,1)$ | 7 | 6 | 5 | 4 | 3 | 2 | 1 | 0 | 0 | 1 | 2 | 3 | 4 | 5 | 6 | 7 |

METHODS AND DEVICES FOR DECODING SIGNALS CONTAINING NOISE AND DISTORTION

BACKGROUND OF THE INVENTION

Viterbi decoding is a technique that is widely used to decode received information in modern digital communication systems. Prior to being received this information has been transmitted by a transmitter. Typically, a transmitter will include an interleaver designed to interleave bits of a signal prior to transmission in order to minimize the effect of burst errors which the signal may be subject to while traversing a channel between the transmitter and a receiver. In addition, a transmitter typically includes a mapper, which is designed to map the so-interleaved bits to so-called constellation symbols prior to transmission through the channel. Unfortunately, the combination of interleaving and then mapping at the transmitter makes it very difficult to de-interleave and de-map the signal at a receiver in order to take advantage of the benefits of Viterbi decoding, especially when the received signal suffers from distortion and/or noise.

SUMMARY OF THE INVENTION

In accordance with the principles of the invention, received signal samples, which may contain both distortion and noise, are decoded in accordance with at least one assigned, reliability-related value. This value acts as a weighting factor of sorts which can then be used by a Viterbi decoder to further decode the signal samples. Because both distortion and noise are part of the samples used in determining the reliability-related values, such decoding can be referred to as a form of soft decision decoding. In one embodiment of the invention, after a received signal sample is mapped to a constellation location, its location (e.g., distance) with respect to a constellation defining axis (e.g., the "I" or "Q" axis of a constellation plane) is used to determine and assign a reliability-related value to the associated signal sample.

BRIEF DESCRIPTION OF THE DRAWINGS

FIG. 4 depicts another table of values for another signal sample according to another embodiment of the present invention.

DETAILED DESCRIPTION OF THE INVENTION

Figure 1:
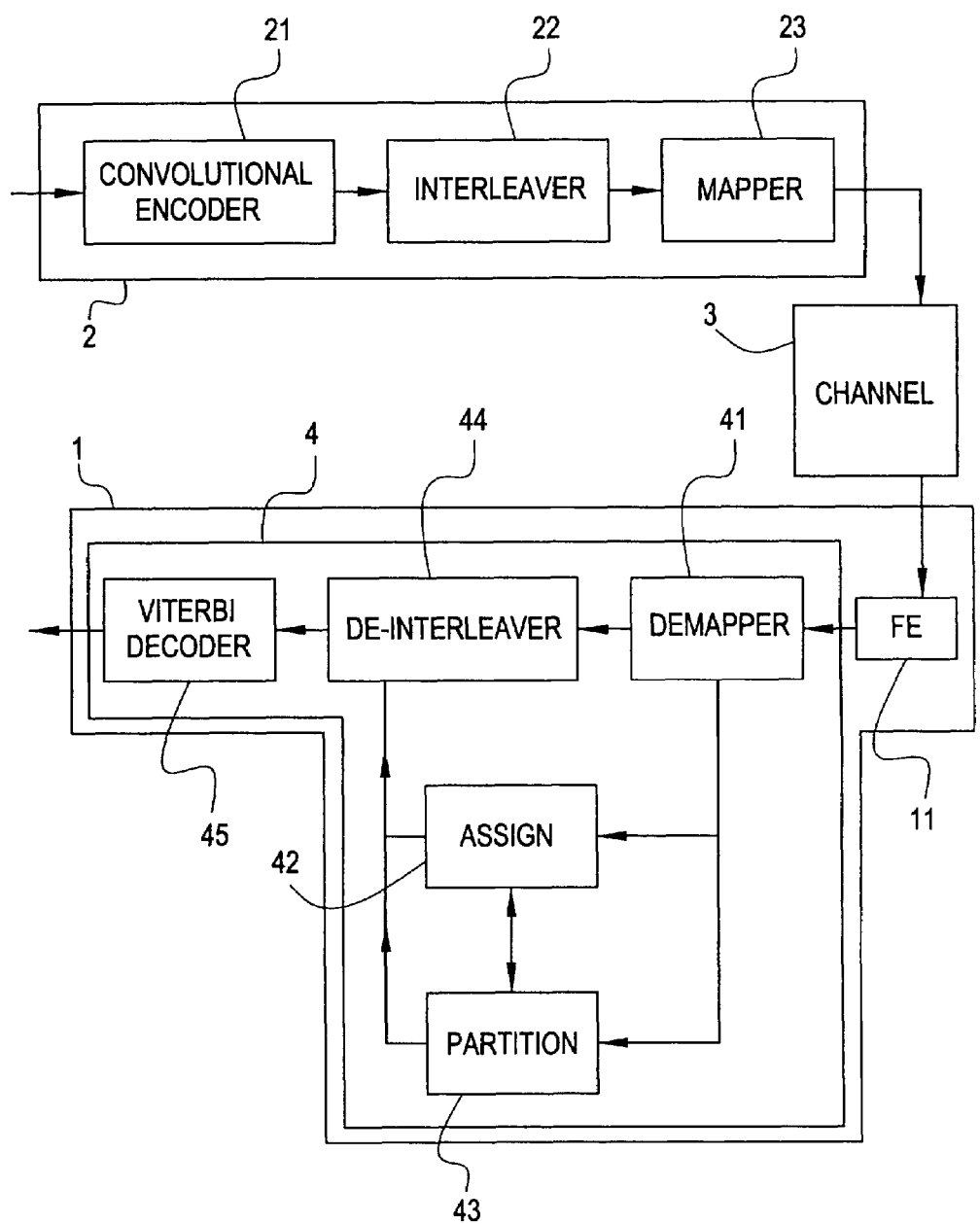
FIG. 1 depicts a simplified block diagram of a transmitter and a receiver combination used to explain embodiments of the present invention.

Referring to FIG. 1, there is shown a receiver 1 and transmitter 2 operable to transmit and receive digital signals via a channel 3, respectively. Transmitter 2 comprises a convolutional encoder 21, interleaver 22, and mapper 23.

Each signal transmitted by transmitter 2 includes a message representing some type of information to be transmitted to the receiver 1. In reality, in addition to the message, each signal includes "noise" generated by many different sources as is known by those skilled in the art. Upon travelling through the channel 3, this message becomes distorted due to various channel conditions, as is also known by those skilled in the art. Prior to being detected and received by the receiver 1, an original message now includes distortion and noise.

In one embodiment of the present invention, the receiver 1 includes a front end section 11 ("FE") and a decoding section 4. The front end section 11 is operable to carry out known detection and receiving functions necessary to receive the transmitted signal. It is not necessary to explain in detail these functions because they are unnecessary for an understanding of the present invention and are well-known to those skilled in the art.

Suffice it to say that the front end section 11 sends a received signal to the decoding section 4. The decoding section 4 includes a de-mapper 41, an assignment section 42, partitioning section 43, de-interleaver 44, and Viterbi decoding section 45. Though shown as separate sections, it should be understood that sections 11 and 41-45 may be combined or further broken down into additional sections. It should also be understood that these sections may be built using hardware, software, firmware, or some combination of the three.

In a further embodiment of the present invention, the decoding section 4 comprises a soft decision decoder which is operable to receive the signal including the distortion and noise and to decode each sample of the signal in accordance with at least one assigned, "reliability-related value." This reliability-related value is assigned by the assignment section 42.

Backtracking somewhat, prior to the assignment of a reliability-related value, the de-mapper 41 is operable to map the received signal to a "constellation location." Thereafter, the assignment section 42 is operable to assign a reliability-related value to the so-mapped signal based on a "distance" between the mapped, constellation location and a constellation defining axis or border. For example, if the mapping section 23 within transmitter 2 is operable to map bits in a transmitted signal based on a 16-quadrature amplitude modulated (QAM) constellation scheme, the de-mapper 41 would analogously "de-map" (i.e., map at the receiving side) a received signal based on a 16-QAM demodulation constellation scheme. In such a scheme, there are 16 constellation reference points (referred to commonly as "symbols," hereafter referred to as "reference points") separated into four quadrants. Each quadrant has a horizontal ("I") axis or border and a vertical ("Q") axis or border (see for example FIG. 2). It is the distance between the mapped, constellation location and one of these two axes that is used by the assignment section 42 to assign an appropriate, reliability-related value. This distance information is referred to as "soft information" and is related to the level of distortion and noise present in a given signal sample. It should be understood that the term signal sample or signal applies equally to a signal that contains some level of distortion as well as to a signal where the level of distortion is equal to zero and to a signal that contains some noise or no noise at all.

In general, the farther the mapped, constellation location is from such an axis, the more reliable the constellation location. In one embodiment of the present invention, the more reliable the location information the smaller the reliability-related value.

Continuing, the decoder 4 seeks to recreate the original message sent by the transmitter 2 using the soft information within the received signal. This type of decoding is called "soft decoding." In contrast, "hard decoding" would filter out or discard the soft information prior to mapping the received signal to a constellation location.

In general, it can be said that the assignment section 42 is operable to assign a reliability-related value to a mapped, constellation location which is associated with each part of the received signal (referred to as a signal sample). For example, if a first sample of a received signal is mapped to a constellation location represented by the location (1,1,1,1), then the assignment section 42 is operable to assign a certain reliability-related value, indicated by the symbol w, to this value resulting in a value of (1,1,1,1)w. The reliability-related value w acts like a "weight," indicating how reliable the mapped, constellation location value (1,1,1,1) is given the distortion and noise present in the signal sample.

In an alternative embodiment of the present invention, the assignment section 42 is further operable to assign the reliability-related value to each bit of a mapped, constellation location associated with the signal. For example, given the constellation location value of (1,1,1,1) the reliability-related value w is mapped to each bit as such: $(1)w_0$, $(1)w_1$, $(1)w_2$, and $(1)w_3$.

It should be understood that assignment of a reliability-related value to an entire constellation location (e.g., 1,1,1,1) is used when the transmitter 2 transmits a "symbol" interleaved signal while the assignment of a reliability-related value to each bit of a mapped, constellation location is used when the transmitter 2 transmits a "bit" interleaved signal.

Once the assignment section 42 has assigned a reliability-related value to each mapped, constellation location or to each bit of a mapped, constellation location, the present invention envisions sending this signal to a de-interleaver 44, operable to de-interleave the de-mapped and assigned signal sample so that it can be fed to the Viterbi decoding section 45.

Figures 2, 3:
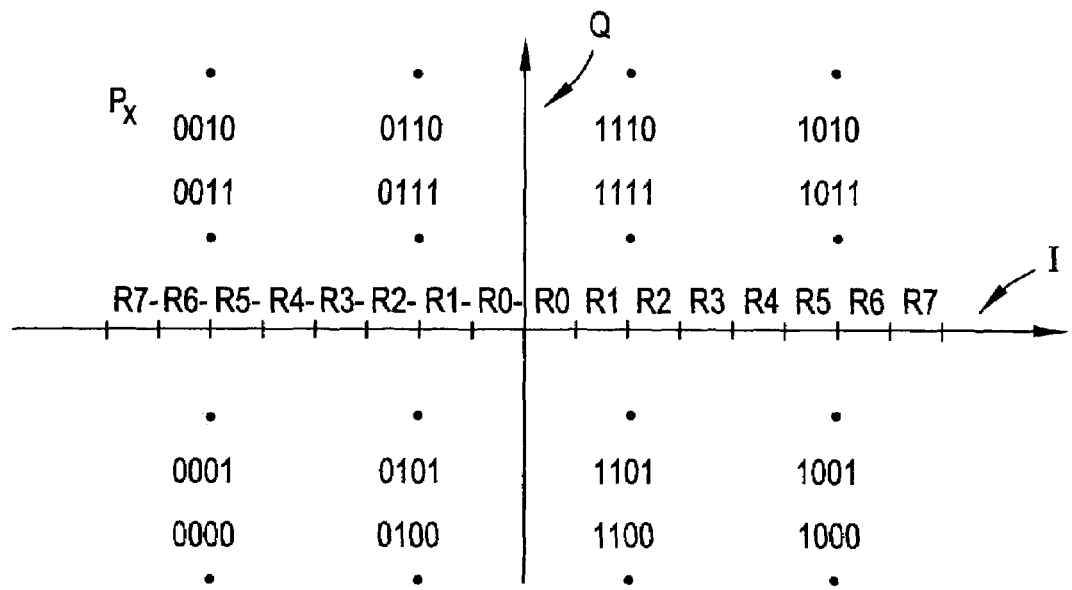
FIG. 2 depicts an example of a constellation plane showing constellation reference points used to explain aspects of the present invention.
FIG. 3 depicts a table of values for a received signal sample according to one embodiment of the present invention.

FIG. 2 depicts an example of a 16-QAM constellation plane showing each of the 16 constellation reference points referred to above. This constellation plane can be used to explain the operation of a soft decision decoder operable to assign a reliability-related value to each bit of a mapped, constellation location. FIG. 3 depicts exemplary values for a received signal sample $b_0$, reliability-related value, w, and distances d(Px, 0) and d(Px, 1). For example, referring to back to FIG. 2, suppose a received signal sample at point $P_x$ falls in region R7, a region very far from the axis, I=0. Based on being located in this quadrant, a value of 0 is assigned to the value $b_0$. In one embodiment of the present invention, the reliability-related value $w_0$ is assigned the value of 00, indicating that the received signal sample located at $P_x$ is highly reliable. In an embodiment of the invention, a reliability scale of "00" to, "01", to "10"to "11" is used where "00" indicates the most reliable location or signal sample and "11" indicates the least reliable location or signal sample.

The distances d(Px,0) and d(Px,1) can be readily used in the calculation of "metrics" by the Viterbi decoding section 45.

The techniques described above can be used to generate a table for a second sample (again corresponding to the I border), $b_1$, as shown in FIG. 4. In addition, it should be further understood that the distances, reliability-related values and b values for samples $b_2$ and $b_3$ corresponding to the Q axis may be generated using the same techniques as described above and below.

Figure 5:
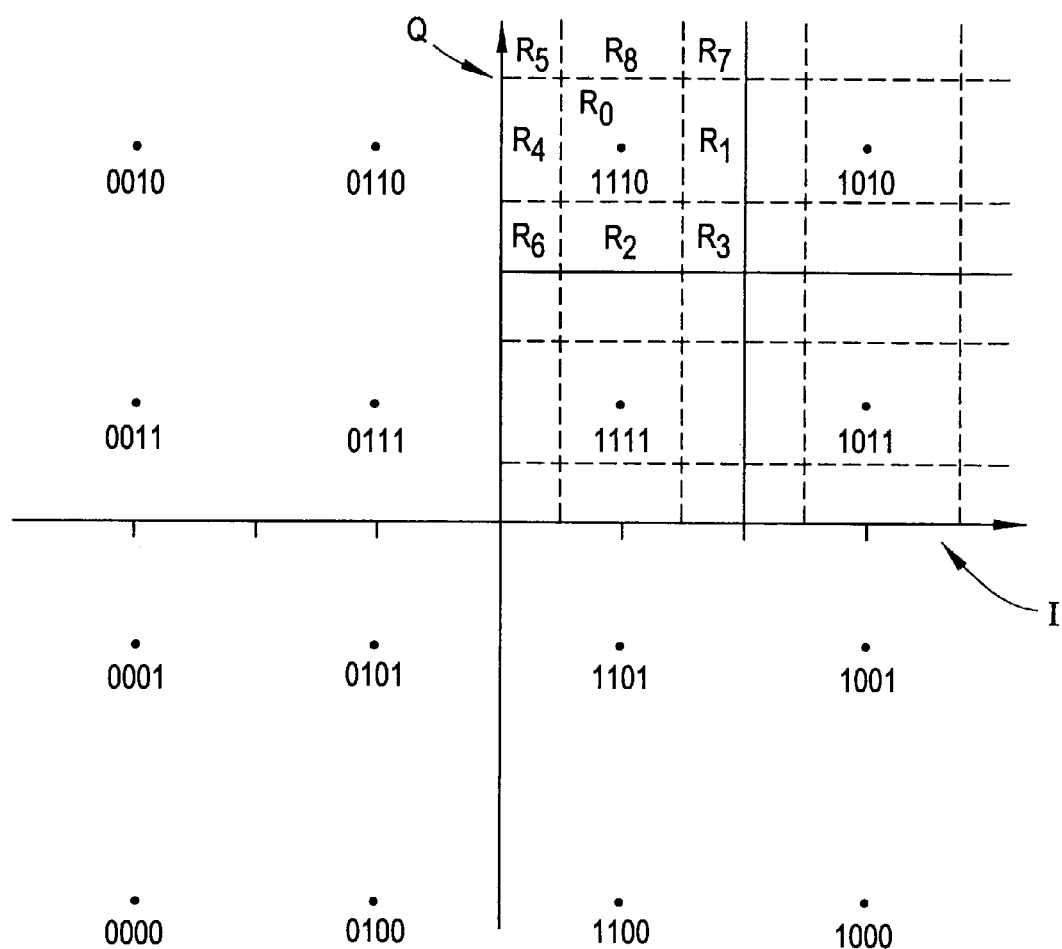
FIG. 5 depicts an area around a constellation reference point partitioned into regions according to one embodiment of the present invention.
Figure 6:
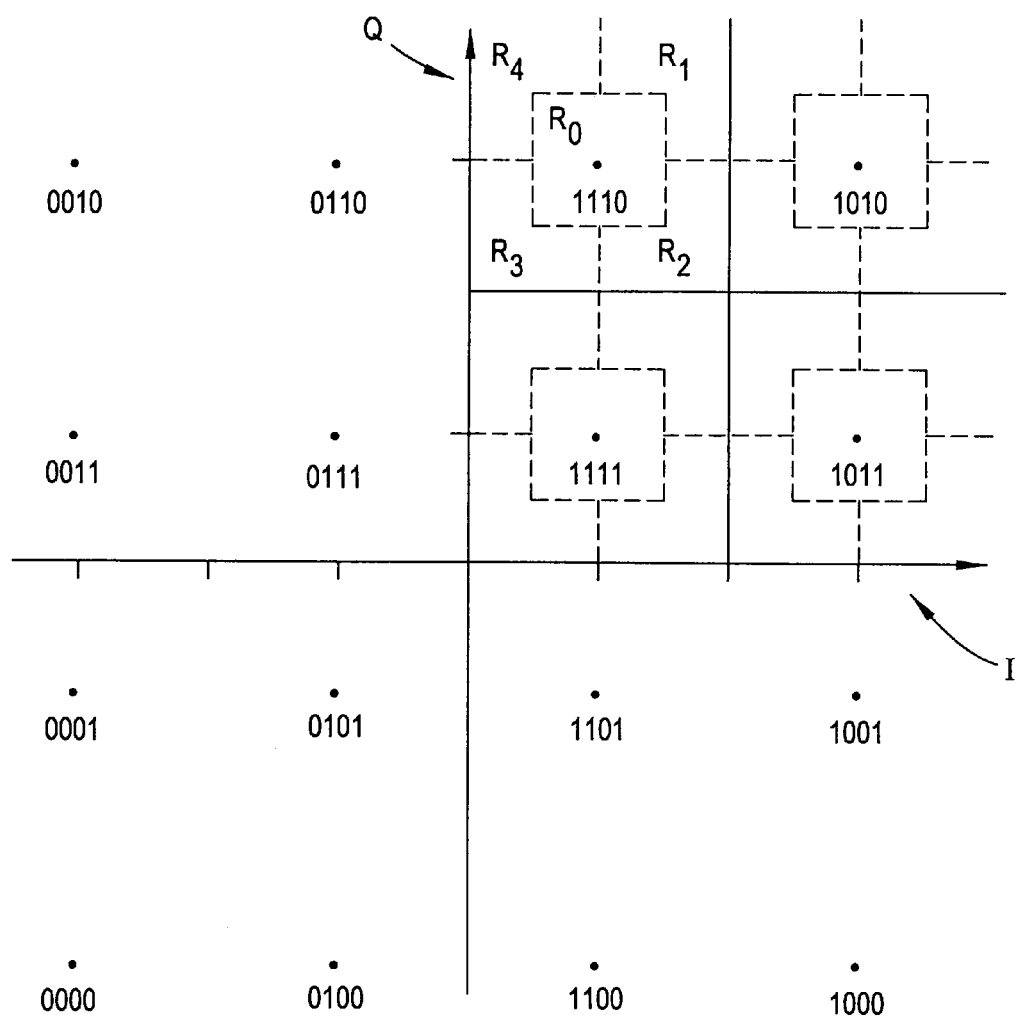
FIG. 6 depicts an area around a constellation reference point partitioned into yet other regions according to yet another embodiment of the present invention.

FIGS. 5 and 6 depict further embodiments of the present invention where the decoder 4 further comprises a partitioning section 43 operable to partition an area around one or more constellation reference points into a number of regions. Thereafter, instead of assigning a reliability-related value to each bit of a received signal sample based on the distance that sample is from an axis, the decoder 4 is operable to assign such values based on considerations regarding the region a received signal sample falls within and, for example, its proximity to neighboring regions, as illustrated in FIGS. 5 and 6.

In FIG. 5, the partitioning section 43 is operable to partition an area around each constellation reference point (e.g., 1,1,1,0) into a central region (e.g., $R_0$) and eight surrounding regions ($R_1$, $R_2$, $R_3$, ... $R_8$). In FIG. 6, the partitioning section 43 is further operable to partition an area around each constellation reference point into a central region (e.g., $R_0$) and four surrounding regions (e.g., $R_1$, $R_2$, $R_3$, and $R_4$).

It should be understood that the examples shown in FIGS. 5 and 6 are just two of the many partitioning schemes which may be envisioned by the present invention. In addition, it should be understood that the values of 1 and 0 noted as b or w may, in fact, be separated by a sign but for ease of understanding, these bits were left out of the discussion and drawings above.

The above discussion has sought to provide examples of the ideas envisioned by the present invention. It is practically impossible to set forth all of the examples envisioned by the present invention, the scope of which is defined by the claims which follow.

We claim:

1. A soft decision decoder, the decoder comprising:
   a receiving section operable to receive a signal sample;
   a de-mapping section operable to map the signal sample to a constellation location; and
   an assignment section operable to assign at least one reliability-related value to the signal sample based on a region which contains the mapped, constellation location and neighboring regions associated with a constellation reference point; and
   a decoding section operable to decode the signal sample in accordance with the at least one assigned, reliability-related value.

2. The decoder as in claim 1, wherein the assignment section is further operable to assign the reliability-related value to a mapped, constellation location associated with the signal sample.

3. The decoder as in claim 1, wherein the assignment section is further operable to assign the reliability-related value to each bit of a mapped, constellation location associated with the signal sample.

4. The decoder as in claim 1 wherein the region is selected from a central region and eight surrounding regions associated with a constellation reference point.

5. The decoder as in claim 1 wherein the region is selected from a central region and four surrounding regions associated with a constellation reference point.

6. A soft decision decoding method comprising the steps of:
   receiving a signal sample;
   mapping the signal sample to a constellation location;
   assigning at least one reliability-related value to the signal sample based on a region which contains the mapped, constellation location and neighboring regions associated with a constellation reference point; and decoding the signal sample in accordance with the at least one assigned, reliability-related value.

7. The method as in claim 6 further comprising the step of further assigning the reliability-related value to a mapped, constellation location associated with the signal sample.

8. The method as in claim 6 further comprising the step of further assigning the reliability-related value to each bit of a mapped, constellation location associated with the signal sample.

9. The method as in claim 6 wherein the region is selected from a central region and eight surrounding regions associated with a constellation reference point.

10. The method as in claim 6 wherein the region is selected from a central region and four surrounding regions associated with a constellation reference point.

11. A soft decision decoder comprising:

means for receiving a signal sample;

means for mapping the signal sample to a constellation location;

means for assigning at least one reliability-related value to the signal sample based on a region which contains the mapped, constellation location and neighboring regions associated with a constellation reference point; and means for decoding the signal sample in accordance with the at least one assigned, reliability-related value.

12. The decoder as in claim 11, wherein the means for assigning further comprises means for assigning the reliability-related value to a mapped, constellation location associated with the signal sample.

13. The decoder as in claim 11, wherein the means for assigning further comprises means for assigning the reliability-related value to each bit of a mapped, constellation location associated with the signal sample.

14. The decoder as in claim 11 wherein the region is selected from a central region and eight surrounding regions associated with a constellation reference point.

15. The decoder as in claim 11 wherein the region is selected from a central region and four surrounding regions associated with a constellation reference point.

\* \* \* \* \*